April 17, 1928.

A. L. JACKSON

GUM STICK HOLDER

Original Filed Feb. 19, 1923

1,666,095

Witness:
R. E. Hamilton

INVENTOR.
Alvin L. Jackson
BY
Warren D. House
His ATTORNEY.

Patented Apr. 17, 1928.

1,666,095

UNITED STATES PATENT OFFICE.

ALVIN L. JACKSON, OF LOGAN, OKLAHOMA.

GUM-STICK HOLDER.

Application filed February 19, 1923, Serial No. 619,798. Renewed January 30, 1928.

My invention relates to improvements in gum stick holders.

One of the objects of my invention is to provide a holder for gum sticks, which serves as a convenient sanitary means for carrying the gum in pockets, which is ornamental, simple, cheap to make, which is durable and not liable to get out of order, and which can be easily filled with gum sticks and the sticks easily ejected one at a time as desired.

The novel features of my invention are hereinafter fully described and claimed.

In the accompanying drawing which illustrates the preferred embodiment of my invention, Fig. 1 is a perspective view of my improved gum stick holder.

Similar reference characters designate similar parts in the different views.

Figure 1:
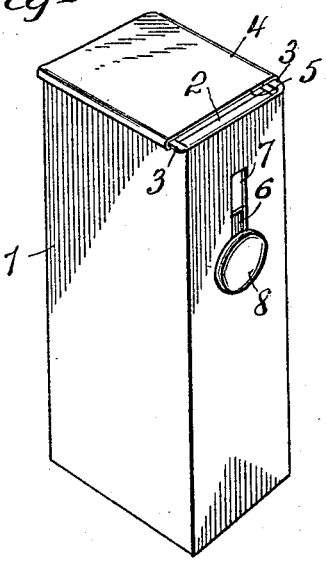
Figure 2:
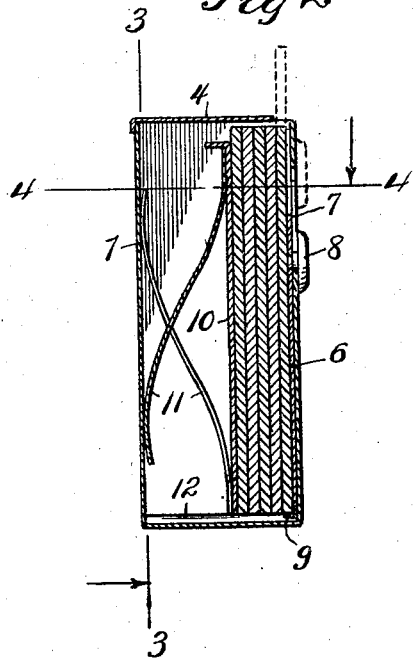
Fig. 2 is a vertical sectional view of the same on the line 2—2 of Fig. 3.
Figure 3:
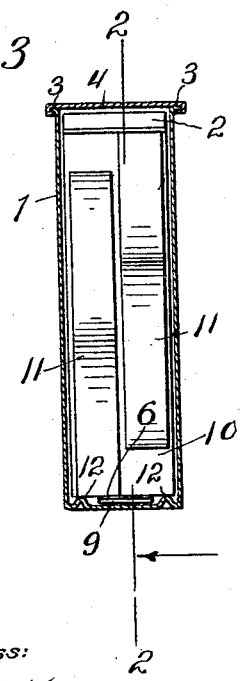
Fig. 3 is a vertical sectional view on the line 3—3 of Fig. 2.
Figure 4:
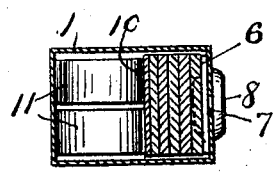
Fig. 4 is a cross section on the line 4—4 of Fig. 2.

1 designates the body of a receptacle having an open end through which are adapted to be inserted sticks of gum 2 disposed side by side, as shown in Fig. 2, said open end of the receptacle having at opposite sides respectively lateral horizontal flanges 3 slidably engaged by a removable cover 4, which in the closed position has its inner end spaced from the adjacent side of the receptacle, thereby providing at one end thereof an opening or ejecting slot 5, through which the gum sticks 2 are adapted to be consecutively ejected.

For consecutively forcing the gum sticks through the slot or opening 5, there is provided in the receptacle 1 a longitudinally slidable ejecting member comprising a flat vertical plate 6, the inner side of which has bearing against it the adjacent gum stick, and the outer side of which slidably engages the inner side of the adjacent side of the body 1, said adjacent side having a longitudinal slot 7, through which extends the stem of a button 8, which provides means at the outer side of the receptacle for manually reciprocating the slide plate 6, for consecutively ejecting the gum sticks.

The inner or lower end of the plate 6 has an inwardly extending projection comprising a lateral flange 9, which is adapted to engage the inner or lower end of the adjacent gum stick for forcing the latter through the opening 5, when the plate 6 is forced upwardly by means of the button 8.

In the receptacle is provided a follower comprising a vertical plate 10, which bears against the gum sticks and normally forces them toward and against the slidable member 6.

Attached to the side of the plate 10 opposite to the side which is against the adjacent gum stick, are two spring plates, 11, one set of ends of which is secured to the plate 10, the other set of ends bearing against the body of the receptacle 1, so as to hold the plate 10 tightly against the gum sticks.

On the upper side of the bottom of the body 1 are two transverse ridges 12, upon which rest the lower ends of the sticks of gum. The flange 9 is adapted to pass below the upper sides of the ridges 12, so that the sticks will be consecutively moved over the flange 9.

In the operation of my invention, the gum sticks 2 are placed within the body 1, after which the cover 4 is slid to the closed position, the gum sticks being placed in a vertical position, side by side between the plates 10 and 6 with their lower ends resting upon the ridges 12. Upon sliding the button 8 upwardly, the flange 9 will force the adjacent gum stick to a position in which it extends outside the receptacle through the opening 5, so that it may be grasped and pulled out of the receptacle, upon which the follower plate 10 will force the remaining gum sticks toward the slidable ejecting member 6, the flange 9 passing under the lower end of the adjacent gum stick, when the member 6 is fully retracted to its initial position.

The gum sticks may thus be consecutively ejected as desired. When empty, the receptacle may be refilled by removing the cover 4 and inserting more gum sticks in the manner already described. By having the cover 4 slidably removable on the end of the receptacle 1, and the ejecting member mounted in the side of the receptacle, the cover may be removed for the insertion of additional gum sticks, without disturbing or releasing the gum sticks already therein, the follower, springs or ejecting member, thereby enabling the easy refilling of the device. By having the cover in the closed position spaced from the adjacent side of the receptacle, an ejecting opening is provided without having to provide the same in the receptacle body.

I do not limit my invention to the structure shown and described, as many modifications, within the scope of the appended claim, may be made without departing from the spirit of my invention.

What I claim is:—

A gum stick holder comprising a receptacle adapted to contain gum sticks disposed side by side, and having an open end for the insertion of gum sticks, a cover slidably removable on said open end and in the closed position having one end spaced from the adjacent side of the receptacle, thereby providing an ejecting opening, an ejecting member slidably mounted on the inner side of said side of the receptacle in alinement with said opening and having means for engaging and forcing an adjacent gum stick through said opening, and means for normally forcing the gum sticks against said ejecting member.

In testimony whereof I have signed my name to this specification.

ALVIN L. JACKSON.